Oct. 17, 1939.   C. S. BROWN   2,176,522
TIDE GATE
Filed Oct. 26, 1937
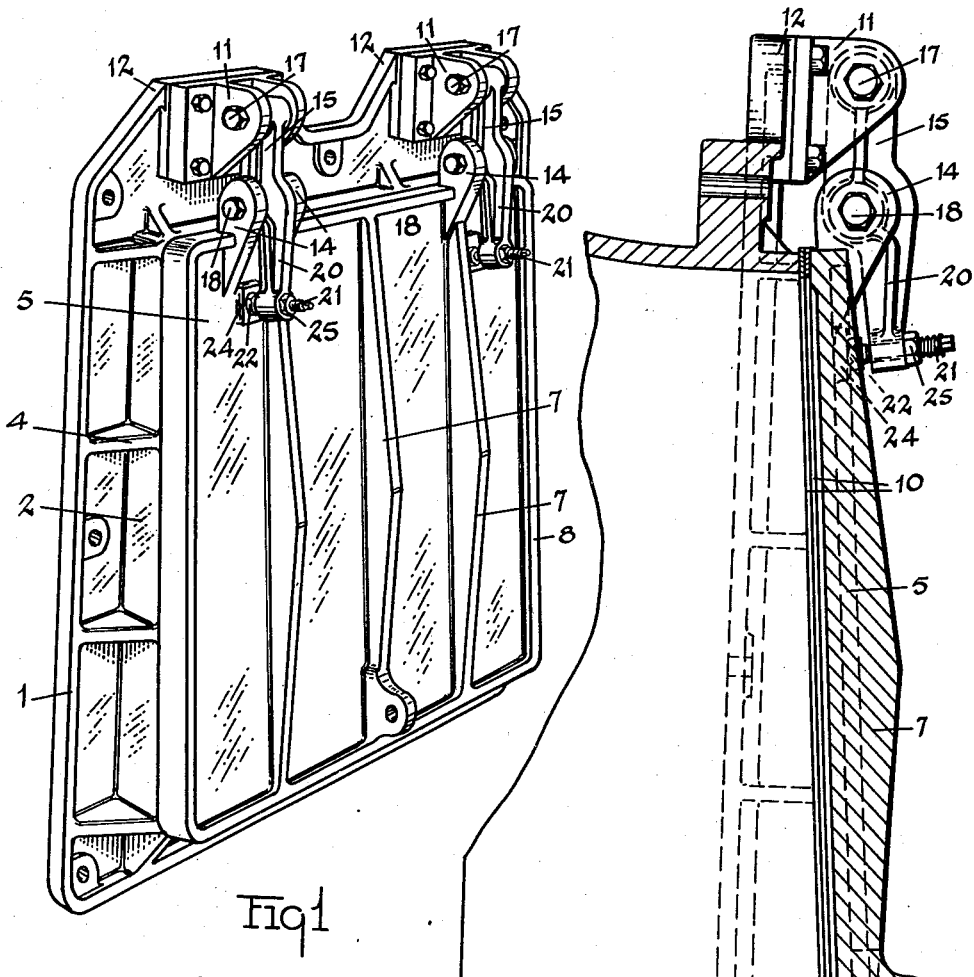
Fig 1
Fig 2
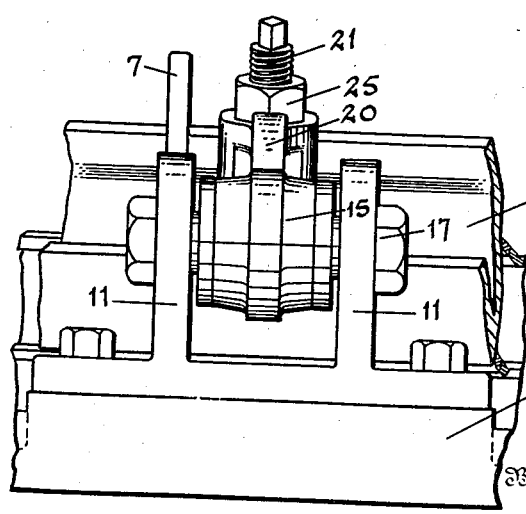
Fig 3
Inventor
Chalmers S. Brown
By Faust & Crampton
Attorney Patented Oct. 17, 1939

2,176,522

UNITED STATES PATENT OFFICE 2,176,522

TIDE GATE

Chalmers S. Brown, Lima, Ohio

Application October 26, 1937, Serial No. 171,010

1 Claim. (Cl. 251—123)

My invention has for its object to provide a gate for controlling the flow of liquids which is constructed so as to be opened and closed by a small differential head of the liquids. The invention particularly provides a link-suspended tide gate having means for substantially maintaining the center of gravity of the gate in a plane extending through the centers of the points of suspension of the links at all times notwithstanding the extent of the opening of the gate and at the same time affords accurate seating of the gate when closed and thereby produces the maximum area of opening with the minimum of head differential.

The invention may be used for controlling the flow of liquids for any desired purpose. It is particularly adapted to be used for sewage discharge into tide water where the head of the liquid to be discharged and the head of the liquid into which it is discharged vary one relative to the other.

The invention may be contained in gates of different forms and to illustrate a practical application of the invention, I have selected a tide gate as an illustration of an embodiment of the invention, it being understood that structures containing the invention may be varied without departing from the spirit of the invention.

Fig. 1 of the drawing illustrates a perspective view of the tide gate selected as an example. Fig. 2 is a view of a vertical section of the gate. Fig. 3 illustrates an enlarged top or end view of one of the suspending links and the relation of the points of suspension to the body of the gate.

In the form of construction illustrated in the drawing, the gate is provided with a suitable frame 1 having flange parts 2 and 3 that extend curvedly rearward and flare Venturi-wise and form the outlet of the gate, which will deliver more flow through the gate and the loss due to eddy currents will be a great deal less than where plane surfaces or cylindrical surfaces surround the outlet of the gate. The frame 1 is suitably reinforced by peripheral flange parts. Also, the outwardly extended flange part 3 is suitably braced and strengthened by triangular webs 4.

The movable gate member 5 is also suitably braced and strengthened by flanges 7 and 8. The edges of the flange 3 and of the movable gate member 5 are provided with suitable intercontacting metal strips or frames 10 that coact to seal the opening and prevent influx of water when the head differential is negative with respect to the direction in which it is intended to direct the flow of the water through the gate.

The frame 1 is provided with suitable brackets 11 that are secured to pads 12 that are formed on projecting parts at the upper end of the frame and the movable gate member 5 is provided with suitable ears 14 that project from the upper end of the movable gate member. Links 15 are pivotally connected to the brackets 11 and the ears 14 by means of the pins 17 and 18 and operate to pivotally support the gate with respect to the frame 1. The edge of the outwardly extending flange part 3 slopes with reference to the vertical to substantially locate the center of gravity of the gate in the vertical plane of the centers of the links when the gate is closed.

The double pivotal connections of each of the links 15 operate to permit the contacting strips or frames 10 to accurately contact with respect to each other, that is, to accurately seat and seal the gate when it is closed, by the rise of the liquid exterior to the gate and prevent influx of the liquid in the reverse direction through the gate.

In order to produce the maximum opening and prevent material surface rubbing at the upper end of the gate, the links 15 are provided with arms 20 which are rigidly connected to the links and protrude downwardly below the centers of the pins 18 and are formed to engage the gate at their ends when it swings outwardly on the pins 18. Preferably, the arms 20 are provided with adjustment screws 21 having heads 22 that contact pads or bosses 24 formed on the gate 5. The screws 21 are provided with suitable locking means, such as the nuts 25, for securing the screws in their adjusted positions. The screws 21 are adjusted to produce a very slight clearance intermediate the heads 22 and the opposing surfaces of the pads 24 to produce a slight play and allow a very slight movement of the gate about the center line of the pins 18 in advance of engagement of the pads with the heads of the screws during the initial opening of the gate and to subsequently cause the gate to swing about the axes of the pins 17 and also permit the gate to adjust itself to the contacting surfaces of the sealing strips or frames 10 as it completes its closing movement and thus seal the gate when closed.

This operates to prevent rubbing of the contacting surfaces of the strips or frames during the opening except for the very slight insignificant or infinitesimal initial movement that is produced in advance of engagement of the surface of the pads 24 with the heads 22 of the screws 21. Upon engagement of the heads 22 of the screws, the movable gate member swings from the line of the centers of the pivot pins 17 and insures a wide opening proportional to the difference in the heads of the liquids. Likewise, in closing, the movement of the gate is about the pivot pins 17. The pivotal movement of the links about the pivot pins 17 and 18 during the limited movements of the gate about the pins 18 enables ready accurate seating of the gate simultaneously throughout the length of its edges to seal the gate as it reaches the final closure point and eliminates rubbing and wear that may be caused by reason of the load on the links and the proximity of the lower pivot pins 18 to the upper edge of the gate. Also the arms increase the area of the opening by forcing the gate to swing on the upper pivot pins 17 and at the same time increase the leverage or moment of force produced by the center of the differential head pressure on the gate.

I claim:

In a gate structure for controlling the flow of liquids; a stationary part having an outlet enclosed by an edge part for the passage of liquids; a gate member having an edge part for engaging the edge part of the outlet and adapted to be opened by liquid pressure in the stationary part; a plurality of links and upper and lower pivot pins for pivotally suspending the gate member on the stationary part, the upper pivot pins being mounted on the stationary part; the gate member having ears adapted to receive the lower pivot pins; the links having arms protruding below the upper edge of the outlet; the protruding ends of the arms having adjustable means for engaging the side of the gate member opposite to that on which the stationary part is located; the edge of the outlet shaped to contact the edge of the gate member when the center of gravity of the gate member is in a vertical plane extending through the pivot pins and the gate member is closed; the arms operative to maintain the center of gravity of the gate substantially in the plane of the axes of the pivot pins.

CHALMERS S. BROWN.